United States Patent [19]
Chadha et al.

[11] Patent Number: 6,061,698
[45] Date of Patent: May 9, 2000

[54] MERGING TAGGED DOCUMENTS AND SCRIPTS HAVING DYNAMIC CONTENT

[75] Inventors: Atul Chadha, Milpitas; Honghai Shen, San Jose, both of Calif.

[73] Assignee: International Business Machines Corporation, Armonk, N.Y.

[21] Appl. No.: 08/955,884

[22] Filed: Oct. 22, 1997

[51] Int. Cl.[7] .................................................... G06F 7/06
[52] U.S. Cl. .......................................... 707/513; 707/501
[58] Field of Search ................................... 707/501, 513; 395/701–710

[56] References Cited

U.S. PATENT DOCUMENTS

| | | | |
|---|---|---|---|
| 4,674,040 | 6/1987 | Barker et al. | 364/300 |
| 4,751,740 | 6/1988 | Wright | 382/1 |
| 5,438,657 | 8/1995 | Nakatani | 395/148 |
| 5,530,794 | 6/1996 | Luebbert | 395/148 |
| 5,701,451 | 12/1997 | Rogers et al. | 395/600 |
| 5,715,453 | 2/1998 | Stewart | 395/615 |
| 5,787,448 | 7/1998 | Anderson et al. | 707/501 |
| 5,835,712 | 11/1998 | DuFresne | 395/200.33 |
| 5,890,171 | 3/1999 | Blumer et al. | 707/501 |
| 5,894,554 | 4/1999 | Lowery et al. | 395/200.33 |
| 5,953,523 | 9/1999 | Martinez et al. | 395/701 |

*Primary Examiner*—Stephen S. Hong
*Assistant Examiner*—Cesar B. Paula
*Attorney, Agent, or Firm*—Ingrid M. Foerster; David S. Kappos; David W. Victor

[57] ABSTRACT

Disclosed are a method and processor for linking a dynamic data fetch command to a document file, the document file initially in a preliminary markup state having at least one matching pair of a special beginning tag and a special ending tag, the tags separately contained in sequential comment statements of the preliminary markup document file, the tags delimiting and identifying an area in the preliminary markup document file for placement of requested dynamic data, the dynamic data fetch command located in a predefined script file having a linkage identifier, comprising the steps of identifying, in the preliminary markup document file, the matching pair of the special beginning tag and the special ending tag to identify the delimited area therebetween; selecting the predefined script file; generating a linked document file from the preliminary markup document file, adding, at the identified area in the preliminary markup document file, the linkage identifier for the selected predefined script file; and merging the predefined script file having the dynamic data variable fetch command with the linked document file.

14 Claims, 4 Drawing Sheets

MERGING TAGGED DOCUMENTS AND SCRIPTS HAVING DYNAMIC CONTENT

TECHNICAL FIELD

This invention relates to the generation of a document file in a data processing system, and, more particularly, to the fetching of dynamic content into a document file.

BACKGROUND OF THE INVENTION

The generation of a document on a data processing system, such as by means of a "tag" language, for example, a generalized markup language, such as HTML (Hypertext Markup Language), or a LATEX document, is enhanced by embedding dynamic data fetched from a data store. The dynamic data allows the document to be dynamic and provide up to date information.

Dynamic data is data that is updated and the updates stored for access in the same data store. One example is stock prices, which may be updated continuously or on a periodic basis.

To fetch data, usually a scripting language is used, such as Net.Data, Visual Basic, or Perl script. Using these script languages along with embedded SQL elements, one can fetch data, and format the data accordingly.

If the document embeds the dynamic data, the data should be fetched whenever the document is referenced, such as whenever it is sent over a network, or whenever it is printed.

Visual tools have been developed for creating a document in the various tag languages, and some visual tools have been developed for fetching data. For example, visual HTML editors are used to write HTML documents, and visual tools to view a latex document. Visual tools are available to generate SQL statements, or generate a Net.Data script that can fetch data. The above visual tools are often used repeatedly during the document development and maintenance process.

A key difficulty is that no single tool is presently usable to both create a document and to write the script to fetch dynamic data.

Since the desired data is dynamic, it is not possible to manually fetch the data from the data base by executing the data script and manually incorporating the data in the desired place in the document each time the dynamic data changes or is to be displayed.

An approach usable to embed dynamic data in a document written in a tag language, when using visual tools for document and data access script creation, is illustrated in FIG. 1.

A visual tool 10 is used to produce a document 11 in a tag language. Examples of visual tools include NetObjects Fusion (by NetObjects, Inc.) or HotMetaL (by SoftQuad, Inc.), which are commercially available and can be used by a user to manually produce a document in HTML. If the user is not totally satisfied with the document 11, the user will make changes 12, using the visual tool 10 again. Examples of changes are the color, font, font size, and the user may want to add to or edit the content. Ultimately, the document 11 is produced, but does not include the desired dynamic data. Rather, it may have an identifier for each instance of dynamic data, or the user will have to remember where each instance of the desired dynamic data is to be placed.

A simplified example of an HTML document page may be:

<HTML>
<TITLE>IBM Stock Report</TITLE>
<P>
The current stock price for IBM is XXX
<P>
</HTML>

A different type of visual tool 15 is employed by the user to produce a script file to access desired data. An example is a visual tool which generates Net.Data scripts. The tool 15 will show the available data bases, and the user will select the desired data base. Then, the tool 15 will show tables of the selected data base, and the user will select the desired table. Next, the tool 15 will show the columns of the selected table and the data of each column, so that the user may select the desired column and dynamic data. Upon selecting the desired data and giving it a criteria or identifier, the tool 15 produces a data script file 16. Other commercially available tools can also allow the user to generate SQL (Structured Query Language) statements for fetching data.

An example of a Net.Data script macro file may be:

```
% define DATABASE = "stock"
% SQL(sql1) {
    select price from quota where company = 'IBM'
    %SQL_REPORT {
        %ROW {
            $(V1)
        %}
    %}
%}
%HTML_REPORT {
%exec_sql (sql1)
%}
```

The above term "% exec_sql(sql11)" is an exemplary Net.data function call which, when executed by Net.data, will execute the SQL statement and put the result into a variable.

When the script file is executed by Net.Data, it will fetch the current IBM stock price for the database.

The user may also decide to make modifications or changes 17 to the script file 16 by again using the tool 15, or, more likely, will want to add additional accesses to other dynamic data as described above.

It is likely that the user will want many instances of dynamic data in the final document, with the result that the last document 11 will have many identifiers (or the user may have an extensive side listing) of intended dynamic data insert points, and that there will be a corresponding number of data script dynamic data accesses in data script file 16 (see FIG. 1).

The difficult project is to merge the data script file 16 and the document 11. Another difficult project is to later modify the document 11.

The merging of the data script file 16 and the document 11 in the prior art is illustrated by step 20. A way of manually conducting the merging of the data script file 16 and the document 11 is to cut and paste parts of document 11 into the data script file 16. This is a very tedious step because every element of document 11 must separately be placed into the data script file 16 and the dynamic data accesses of data script file 16 must be located at the appropriate points in the document as desired by the user.

The data script file program (e.g., Net.Data) is then run to produce the final document 21.

The incorporation of both the HTML file and the Net.Data script file into the final Net.Data script file appears as:

```
%define DATABASE = "stock"
%SQL(sql1) {
    select price from quota where company = 'IBM'
    %SQL_REPORT {
        %ROW {
            $(V1)
        %}
    %}
%}
%HTML_REPORT {
<HTML>
<TITLE>IBM Stock Report</TITLE>
<P >
The current stock price for IBM is % exec_sql(sql1)
<P >
</HTML>
%}
```

If the user wishes to change or modify the document 21 at this stage, such as to change color, there is no way to do so, since the visual tool 10 is not available to the user at this stage. Rather, the user must go back to visual tool 10, make the change to document 11, and create the final document 21 again in step 20. Since this step 20 essentially repeats the incorporation work, it can be very tedious.

The key difficulty, again, is that no single tool is presently usable to both create a document and to write the script to fetch dynamic data. Therefore, two tools 10 and 15 must be used separately to produce a separate document and script, and the tedious manual step 20 employed to merge the two. Executing the final script will produce the final document 21.

Each time the user wishes to change the document, tool 10 must be used with document 11 as the basis for the change. The tedious manual merge step 20 must then be repeated to generate the changed final script.

SUMMARY OF THE INVENTION

An object of the present invention is to provide a method for merging dynamic data access commands and a document, and for generating a final document from the merged document.

Disclosed are a method and processor for linking a dynamic data fetch command to a document file, the document file initially in a preliminary markup state having at least one matching pair of a special beginning tag and a special ending tag, the tags separately contained in sequential comment statements of the preliminary markup document file, the tags delimiting and identifying an area in the preliminary markup document file for placement of requested dynamic data, the dynamic data fetch command located in a predefined script file, the predefined script file having a linkage identifier, comprising the steps of:

identifying, in the preliminary markup document file, the matching pair of the special beginning tag and the ending tag, thereby identifying the delimited area therebetween;

selecting the predefined script file;

generating a linked document file by adding, at the identified area in the preliminary markup document file, the linkage identifier for the selected predefined script file; and generating a final script file merging the predefined script file having the dynamic data fetch command with the linked document file.

For a fuller understanding of the present invention, reference should be made to the following detailed description taken in conjunction with the accompanying drawings.

DETAILED DESCRIPTION OF THE INVENTION

Figure 1:
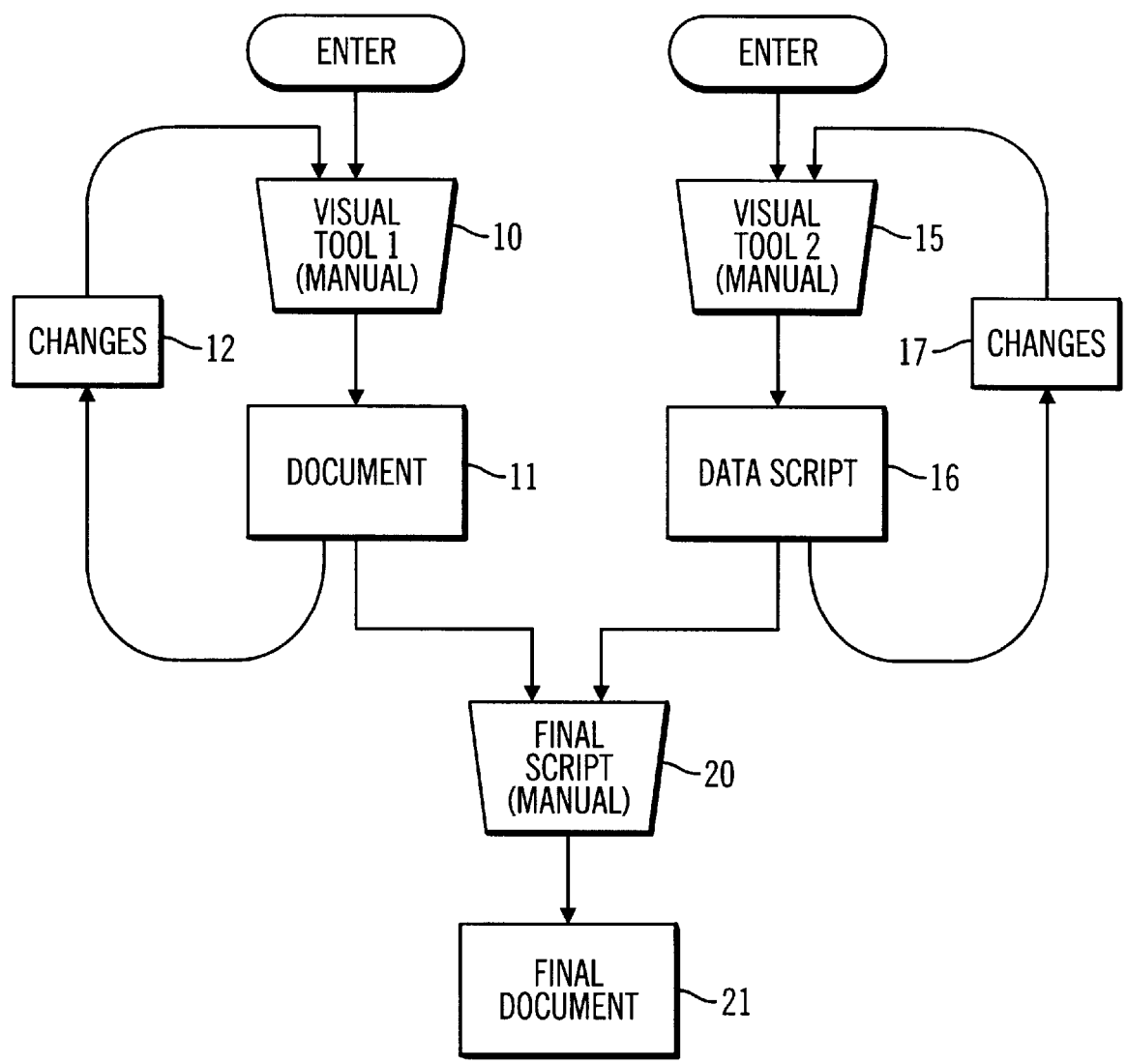
FIG. 1 is a diagrammatic representation of the prior art process flow for generating a document incorporating dynamic data.
Figure 2:
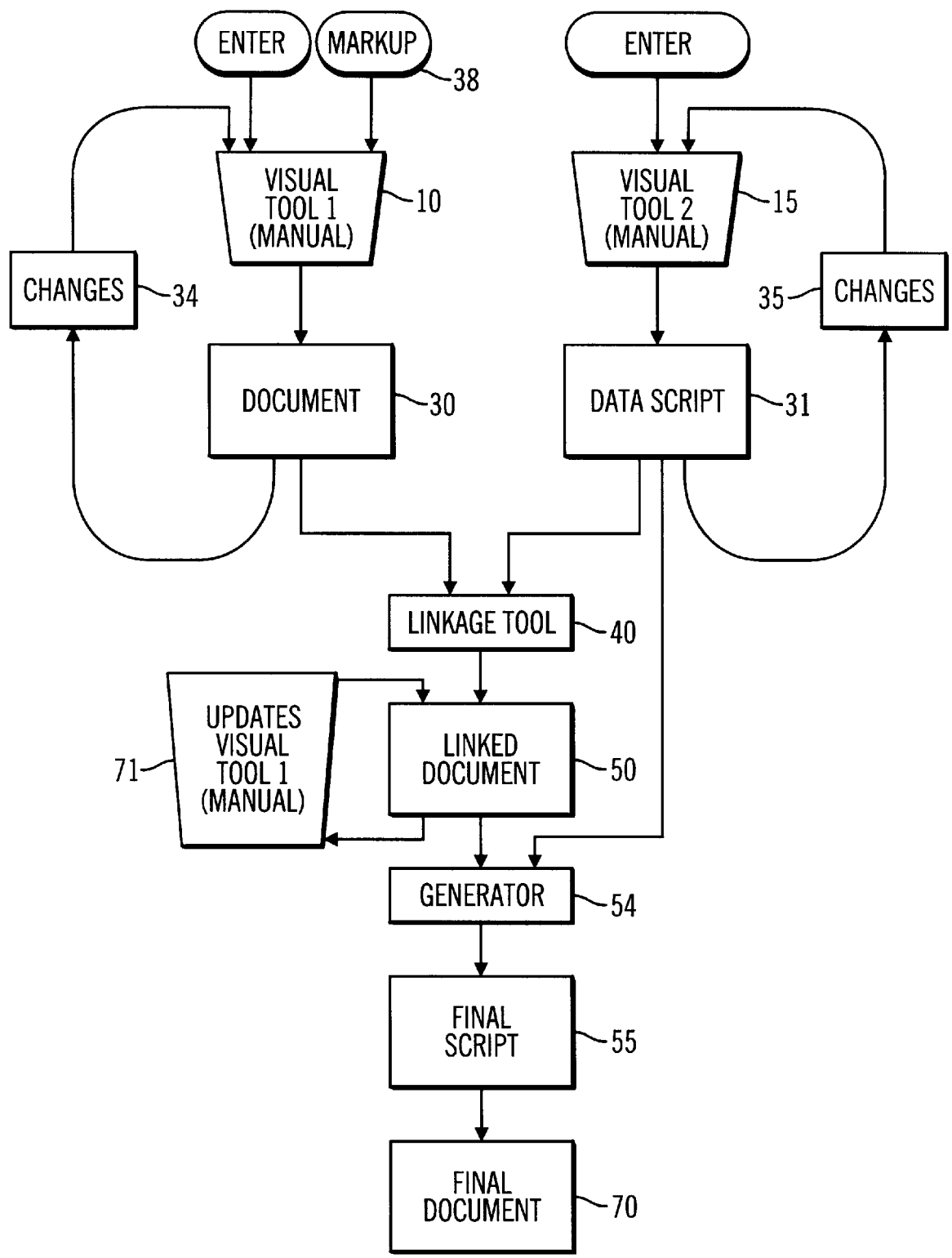
FIG. 2 is a diagrammatic representation of the process flow of the present invention for generating a document incorporating dynamic data.

Referring to FIG. 2, the present invention provides a generic way to insert dynamic data into a tagged document. In one embodiment, the present invention comprises a method implemented by a data processing computer. In another embodiment, the invention comprises a system of a data processing computer. The invention may also be implemented to provide a signal bearing medium tangibly embodying computer readable code as a computer program product stored in a storage device, such as a magnetic disk drive or memory, etc., in a computer, or as an article of manufacture, such as a CD ROM, magnetic tape, etc. The user will have used a visual tool 10 as in the prior art to create a document file 30 that needs to have dynamic data filled in. The user will also have used a tool 15 as in the prior art to create a script file 31, such as Net.Data macro file or similar file, that can be executed to fetch data from a database into variables. As with respect to the prior art, the user will have made many changes to document 30, using the visual tool to change the document. Similarly, the user will likely have made changes to the script file 31, adding additional dynamic data fetching command sequences and possibly making other changes.

To operate the invention, the user will conduct a markup phase 38 by inserting appropriate "special" tags into the places where the user wants to have dynamic data filled in. The special tags are placed as comments of the corresponding tag language of the tool 10 and of the document 30. The special tags are recognizable by the program of the present invention as designating that dynamic data is to be entered. For example, the special tags may comprise a matching pair of a beginning special tag and ending special tag, and delimiting and identifying the area between as the location of the desired dynamic data.

The format of the special tag is in the form of the matching pair:

<begin datatag>

<end datatag>

Using the same example as before, the user will mark up the HTML document 30 as follows:

<HTML>

<TITLE>IBM Stock Report</TITLE>

<P>

The current stock price for IBM is <!-dtb ->XXX<!-/dte ->

<P>

</HTML>

In HTML format, the "<!-" and "->" designate the beginning and the end of a comment. In an example of the format of the invention, "dtb" and "/dte" designate the matching pair of a special beginning tag and a special ending tag, respectively, and, for the purpose of the invention, delimiting the area therebetween.

The script file created by visual tool 15 will be the same macro as in the prior art as follows:

```
%define DATAEASE = "stock"
%SQL(sql1) {
    select price from quota where company = "IBM"
    %SQL_REPORT {
        %ROW {
            $(V1)
        %}
    %}
%}
%HTML_REPORT {
    %exec_sql(sql1)
%}
```

The linking information of the script file is the source string "% exec_sql(sql11)" variable, identified by the "% exec_" term.

The script file may also be marked up in a markup phase (not shown) in the use of visual tool 15, allowing the variable to be directly presented to the user in the prompting step 44.

A linkage tool 40 of the present invention is used to make the linkage between the document 30 and the data script file 31.

Figure 3:
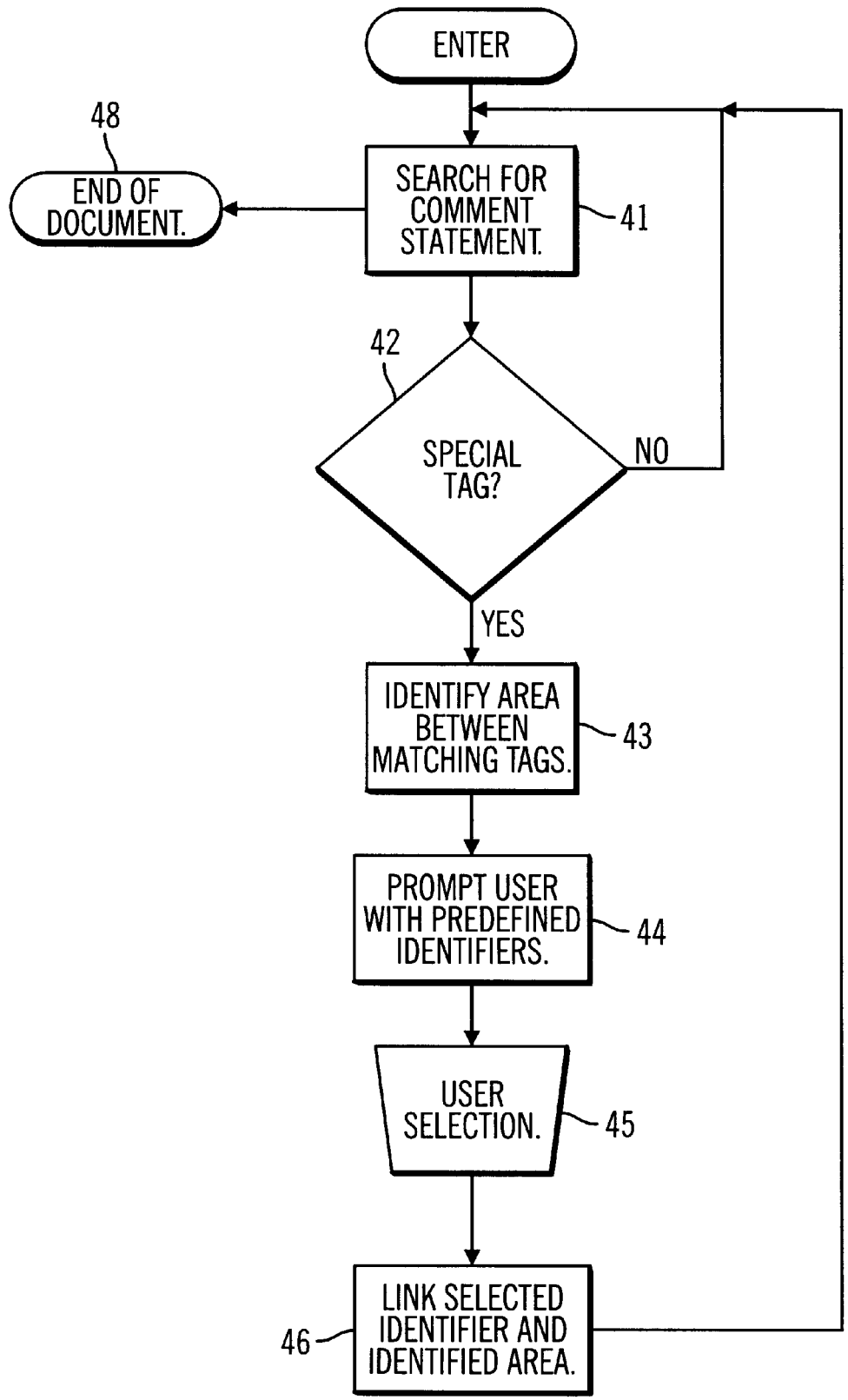
FIG. 3 is a flow chart depicting the linkage process of FIG. 2.

The linkage tool 40 is illustrated in FIG. 3.

In step 41, document 30 is searched to locate comment statements. As an example, step 41 searches the document 30 sequentially. Upon identifying a comment statement, step 42 determines whether a "special tag" is incorporated in the comment statement. If "No", the process loops to step 41 to again search for the next comment statement. If "YES", step 43 identifies the area between a matching pair of special comment statements. In the specific example, the matching pair of comment statements are:

<!-dtb ->and
  <!-/dte ->.

Thus, the area between the matching pair of comment statements in the example is "XXX".

In step 44, the user is prompted to make a selection of the desired predefined script file to match the area between the matching pair of comment statements. The prompting may, for example, be of the next sequentially available predefined script file variable identifier. If the user does not select the displayed predefined script file, the next sequentially available predefined script file will be shown. Alternatively, all predefined script file variable identifiers may be displayed, or all of the predefined script file variable identifiers that have not been previously selected. The display may, for example, be in the form of a listing of an identifier together with a definition statement or with a comment which helps to indicate to the user which of the predefined script files is identified in the list.

In step 45, the user makes the selection, and step 46 performs the link by substituting the variable statement of the desired tag for the link in the area between the matching pair of comment statements.

In the above example, with the tag in the form of a matching pair, the link is made as follows in step 46:

<begin datatag, subs/source-string/target-string>
  <end datatag>, the link of the items marked up in the HTML file to the dynamic data items defined in the script file is:
  <HTML>
  <TITLE>IBM stock Report</TITLE>
  <P>
  The current stock price for IBM is <!-dtb s/XXX/% exec_sql(sql1)->XXX<!-/dte ->
  <P>
  </HTML>.

As the result of the linking, the original tag is changed by substituting to embed the linking information. The only change to the document 30 are the dynamic data linkage identifiers that link to dynamic data variable fetch commands in the data script file 31. The dynamic data linkage identifier comprises a linkage command which when executed, will substitute the linked dynamic data variable command into the linked document at the linked location.

Upon completion of linking step 46, the process loops back to step 41 to search for the next comment statement, etc. After the entire document has been searched for comment statements and for special tags within comment statements, the process terminates 48 at the end of the document.

As an alternative to presenting the user with the predefined script file variable identifier, a comment in the script file may be utilized which is identified in similar fashion to that of the special tag of the document.

Referring again to FIG. 2, linkage tool 40, upon completion of the process of FIG. 3, produces linked document 50.

In the generation phase 54, the script file 31 is merged with the linked document 50 to create a final script file 55.

Figure 4:
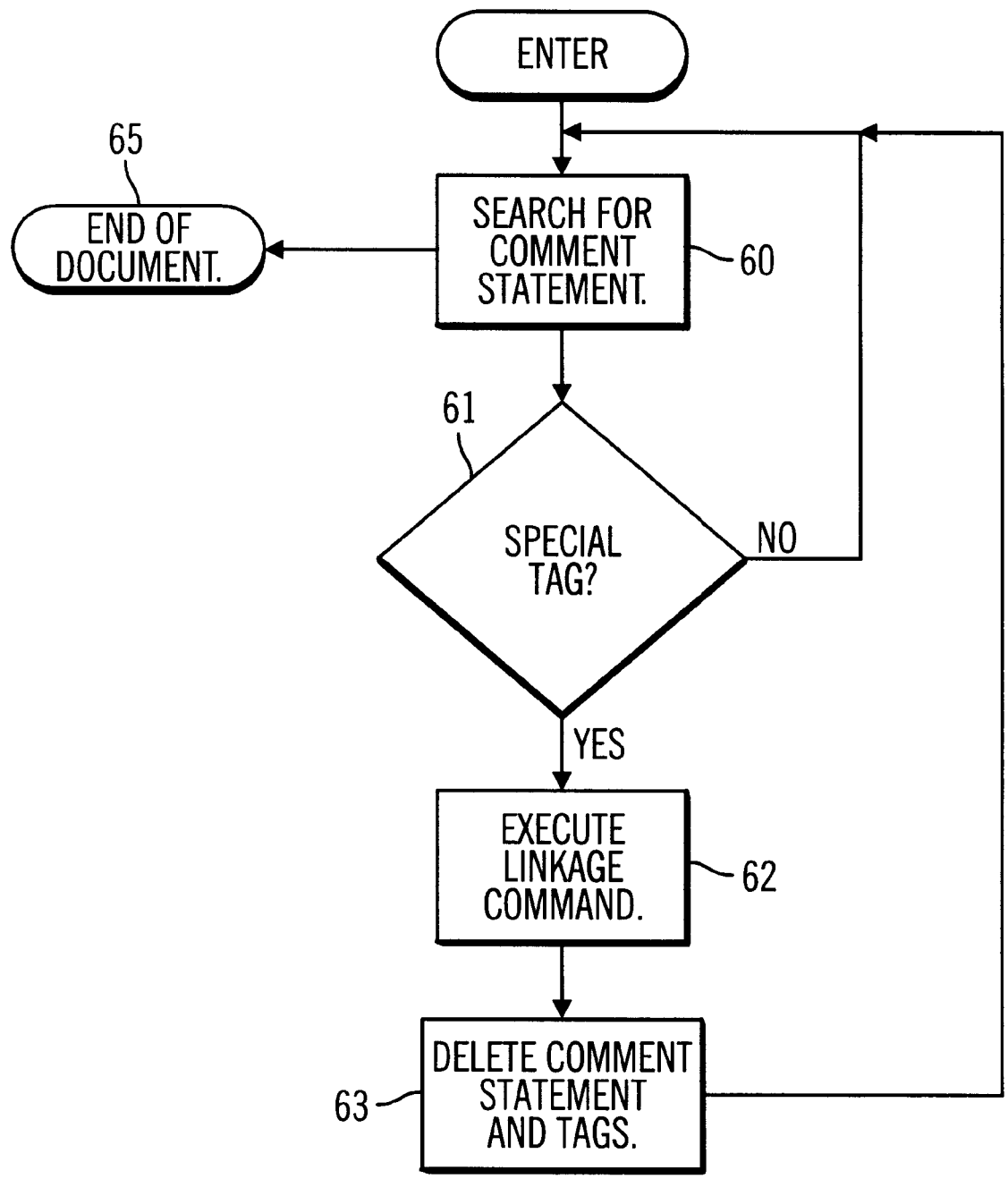
FIG. 4 is a flow chart depicting the merging process of FIG. 2.

The merging process is illustrated in FIG. 4 and involves performing substitutions of marked text based on the contents of the special tags. In step 60, document 50 is searched to locate comment statements, preferably in the same manner as step 41 of FIG. 3. As an example, step 60 searches the document 50 sequentially. Upon identifying a comment statement, step 61 determines whether a "special tag" is incorporated in the comment statement. If "NO", the process loops to step 60 to again search for the next comment statement. If "YES", step 62 executes the linkage command to substitute the marked text into the data script file at the location of the linkage identifier.

Then, the process deletes the comment statements and special tags in step 63. The process then loops back to step 60 to search the linked document for the next comment statement.

After the entire document has been searched for comment statements and for special tags within comment statements and all commands executed, data script files are effectively merged with the document and the process terminates 65 at the end of the linked document 50.

The result of the process of FIG. 4 is the final script file 55. In the instant example, the file 55 incorporates the linked document 50 and the Net.Data script files 31 into a final Net.Data script file 55 of FIG. 2, which appears as:

```
%define DATABASE = "stock"
%SQL(sql1) {
    select price from quota where company = 'IBM'
    %SQL_REPORT {
        %ROW {
            $(V1)
        %}
    %}
%}
%HTML_REPORT {
<HTML>
<TITLE>IBM Stock Report</TITLE>
<P>
```

-continued

```
The current stock price for IBM is %exec_sql(sql1)
<P>
</HTML>
%}
```

The final document 70 for display is then generated by the normal Net.Data system.

If it is desired to make subsequent updates or to make changes, visual tool 1 may be used in step 71 to change the linked document 50 without starting over as is required by the prior art process and without relinking the document with linkage tool 40. Examples of changes are font sizes or colors, or adding material to the document 50.

Once all the changes have been made, the generator process 54 is again run to generate a new final document 70.

These changes can be made because the markup process 38 and link process 40 do not change the visual properties of the original document 30 and script files 31. The user can still use his favorite visual tools 71 to change the document after the markup and linkage processes, and the linking information is not lost after the changes have been made.

The programming of the present invention may comprise a computer program product embodied as program code stored in a storage device, such as a magnetic disk drive or memory etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for linking a dynamic data fetch command to a document file, said document file initially in a preliminary markup state having at least one matching pair of a special beginning tag and a special ending tag, said tags separately contained in sequential comment statements of said preliminary markup document file, said tags delimiting and identifying an area in said preliminary markup document file for placement of requested dynamic data, said dynamic data fetch command located in a predefined script file, said predefined script file having a linkage identifier, comprising the steps of:

identifying, in said preliminary markup document file, said matching pair of said special beginning tag and said ending tag, thereby identifying said delimited area therebetween;

selecting said predefined script file;

generating a linked document file from said preliminary markup document file, adding, at said identified area in said preliminary markup document file, said linkage identifier for said selected predefined script file; and generating a final script file merging said predefined script file having said dynamic data fetch command with said linked document file.

2. The method of claim 1, wherein said identification step comprises:

searching said preliminary markup file to identify said comment statements; and selecting each of said identified comment statements having said special beginning tag, said special beginning tag and a matching pair ending tag delimiting and identifying said area.

3. The method of claim 2, wherein predefined script file selection step comprises responding to each said selected delimited identified area by prompting a user to select one of said preferred script files said user wishes to correspond to said identified area.

4. The method of claim 3, wherein said prompting step of said predefined script file selection step additionally comprises presenting all said predefined script file linkage identifiers to said user for selection.

5. The method of claim 1, comprising the additional step of:

in response to a subsequent change to said linked document file, again generating a final script file merging said predefined script file having said dynamic data fetch command with said document file, said linked document file incorporating said subsequent change.

6. A system for linking a dynamic data fetch command to a document file, said document file initially in a preliminary markup state having at least one matching pair of a special beginning tag and a special ending tag, said tags separately contained in sequential comment statements of said preliminary markup document file, said tags delimiting and identifying an area in said preliminary markup document file for placement of requested dynamic data, said dynamic data fetch command located in a predefined script file, said predefined script file having a linkage identifier, comprising:

a search processor for identifying, in said preliminary markup document file, said matching pair of said special beginning tag and said ending tag, thereby identifying said delimited area therebetween;

a prompting processor for responding to each said identification of said identified area by prompting a user to select one of said preferred script files said user wishes to correspond to said identified area;

a linking processor for generating a linked document file from said preliminary markup document file, adding, at said identified area in said preliminary markup document file, said linkage identifier for said selected predefined script file; and a document generation processor for generating a final script file merging said predefined script file having said dynamic data fetch command with said linked document file.

7. The system of claim 6, wherein said prompting processor additionally presents all said predefined script file linkage identifiers to said user for selection.

8. The system of claim 6, wherein said document generation processor additionally, in response to a subsequent change to said linked document file, again generates a final script file by merging said predefined script file having said dynamic data fetch command with said linked document file.

9. An article of manufacture comprising a computer readable medium having computer readable program code embodied therein for linking a dynamic data fetch command to a document file, said document file initially in a preliminary markup state having at least one matching pair of a special beginning tag and a special ending tag, said tags separately contained in sequential comment statements of said preliminary markup document file, said tags delimiting and identifying an area in said preliminary markup document file for placement of requested dynamic data, said dynamic data fetch command located in a predefined script file, said predefined script file having a linkage identifier, comprising:

computer readable program code which causes a computer processor to identify, in said preliminary markup document file, said matching pair of said special beginning tag and said special ending tag, thereby identifying said delimited area therebetween;

computer readable program code which causes said computer processor to respond to each said identification of said identified area by prompting a user to select one of said preferred script files said user wishes to correspond to said identified area;

computer readable program code which causes said computer processor to generate a linked document file from said preliminary markup document file, adding, at said identified area in said preliminary markup visual document file, said linkage identifier for said selected predefined script file; and computer readable program code which causes said computer processor to generate a final script file merging said predefined script file having said dynamic data fetch command with said linked document file.

10. The article of manufacture of claim 9, wherein said computer readable program code which causes said computer processor to prompt said user, additionally causes said computer processor to present all said predefined script file linkage identifiers to said user for selection.

11. The article of manufacture of claim 9, wherein said computer readable program code which causes said computer processor to generate said final script file, additionally, in response to a subsequent change to said linked document file, causes said computer processor to again merge said predefined script file having said dynamic data fetch command with said linked document file.

12. A computer program product usable with a programmable computer having computer readable program code embodied therein for linking a dynamic data fetch command to a document file, said document file initially in a preliminary markup state having at least one matching pair of a special beginning tag and a special ending tag, said tags separately contained in sequential comment statements of said preliminary markup document file, said tags delimiting and identifying an area in said preliminary markup document file for placement of requested dynamic data, said dynamic data fetch command located in a predefined script file, said predefined script file having a linkage identifier, comprising:

computer readable program code which causes said programmable computer to identify, in said preliminary markup document file, said matching pair of said special beginning tag and said ending tag, thereby identifying said delimited area therebetween;

computer readable program code which causes said programmable computer to respond to each said identification of said identified area by prompting a user to select one of said preferred script files said user wishes to correspond to said identified area;

computer readable program code which causes said programmable computer to generate a linked document file from said preliminary markup document file, adding, at said identified area in said preliminary markup document file, said linkage identifier for said selected predefined script file; and computer readable program code which causes said programmable computer to generate a final script file merging said predefined script file having said dynamic data linkage fetch command with said linked document file.

13. The computer program product of claim 12, wherein said computer readable program code which causes said programmable computer to prompt said user, additionally causes said programmable computer to present all said predefined script file linkage identifiers to said user for selection.

14. The computer program product of claim 12, wherein said computer readable program code which causes said programmable computer to generate said final script file, additionally, in response to a subsequent change to said linked document file, causes said programmable computer to again generate a final script file merging said predefined script file having said dynamic data fetch command with said linked document file.

* * * * *